April 8, 1952 — J. F. CHITTUM — 2,592,511

SCALE PREVENTION IN OIL WELLS

Filed Jan. 7, 1950

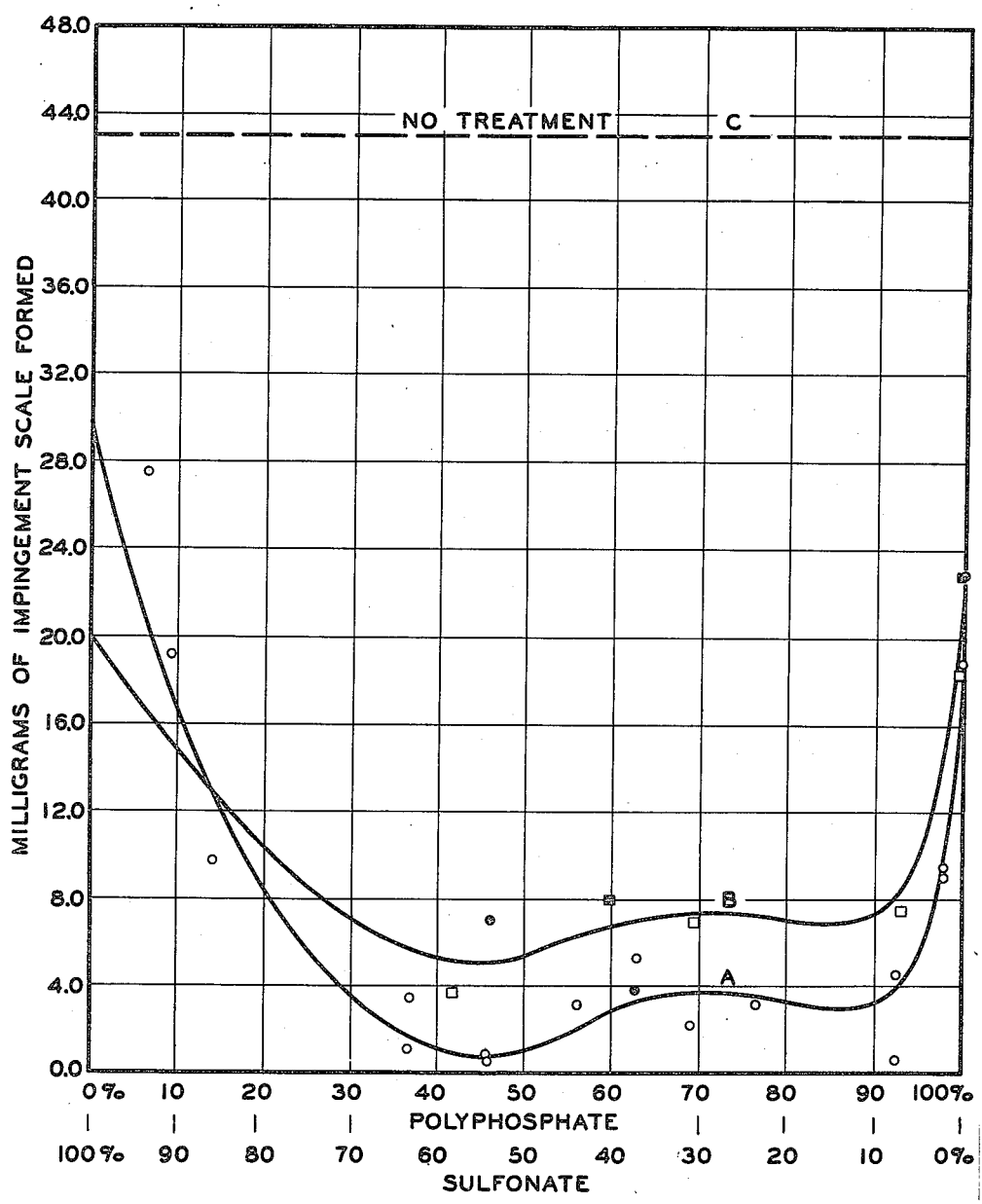

- ○ SODIUM SULFONATE (AV. MOL. WT. 380) AND TETRASODIUM PYROPHOSPHATE
- ⊙ SODIUM SULFONATE (AV. MOL. WT. 380) AND SODIUM HEXAMETAPHOSPHATE
- □ SODIUM SULFONATE (AV. MOL. WT. 440) AND TETRASODIUM PYROPHOSPHATE
- ⊡ SODIUM SULFONATE (AV. MOL. WT. 440) AND SODIUM HEXAMETAPHOSPHATE

INVENTOR
Joseph F. Chittum

BY: Walter G. Miller
Ralph L. Freeland
ATTORNEYS

Patented Apr. 8, 1952

2,592,511

UNITED STATES PATENT OFFICE 2,592,511

SCALE PREVENTION IN OIL WELLS

Joseph F. Chittum, Whittier, Calif., assignor to California Research Corporation, San Francisco, Calif., a corporation of Delaware Application January 7, 1950, Serial No. 137,351

6 Claims. (Cl. 252—8.55)

The present invention is directed to the prevention of scale in the pumps, valves, tubing and other accessories at the bottom of oil wells, in which the water produced with the oil or gas contains a relatively high concentration of bicarbonate ions, and specifically relates to a mixture of petroleum sulfonates or surface-active agents and calcium-sequestering chemicals which act in combination to prevent the formation of the scale which is formed by impingement, agitation, or rapid motion of the fluids flowing in the well.

In the normal operation of many oil wells, a considerable amount of water is produced with the oil, and there also exists relatively high turbulence of the liquids through perforations in the well casing, around valves and other flow control means, pumps, and the like. This turbulence appears to promote the release of carbon dioxide, so that calcium carbonate is precipitated out in the water, particularly where it originally contains a high concentration of bicarbonate ions, the resulting hard and adherent calcium carbonate deposits on the metal parts being designated "impingement" scale, which tends to form at points of high turbulence. It has been found that the presence of a material, such as a surface-active alkali-metal sulfonate dissolved in the water phase, which will wet the surface of the metal valves, pumps, and the like, together with a calcium-sequestering agent, such as a water-soluble polyphosphate, will prevent the formation of impingement scale and will also remove it from wells in which it has already formed. These treating agents are desirably introduced continuously into the well casing at a low rate, for example, one to ten gallons per day, in such a manner that they will mix with the water being produced with the oil and act in the manner just described. The exact rate of introduction obviously will vary with the specific conditions found in each well and may readily be determined by simple tests, as is customary in the art of well production.

Examples of preferred materials and the results obtained by their use in laboratory tests and in the field are given in the attached drawing and in the following description. In the drawing curves A and B represent the reductions in scale formation by the use of varying proportions of sodium sulfonates of different average molecular weights, about 380 and 440, respectively, with two examples of calcium-sequestering agents, namely, tetra sodium pyrophosphate and sodium hexametaphosphate. Line C represents the quantity of scale formed when neither of these materials was used.

Certain of the alkyl aryl sulfonate surface-active or wetting agents sold commercially may contain substantial proportions of alkali metal sulfate, depending upon their method of manufacture. It has been found that the presence of these sulfates has no deterimental effect on the surface activity of the alkali metal sulfonates as utilized in this invention.

It is the primary object of this invention to provide a method for preventing the formation of impingement scale in the pumps, valves, and other equipment associated with the tubing and casing of an oil well which is producing water with the oil.

Examples of surface-active anionic agents which have been found suitable for this invention are water-soluble sodium sulfonates produced from petroleum by treatment of aromatic extracts with a strong acid, for example, sulfuric acid, followed by neutralization with sodium hydroxide, and the alkyl aryl sulfonates which result from the process described in A. H. Lewis Patent 2,477,383, in which alkanes are sulfonated by sulfuric acid and neutralized with caustic to form detergents or wetting agents. In general, the molecular weight of these materials will range from about 250 to 470, with a preferred range of about 320 to 400. If these materials are used alone, they will reduce the impingement scale formed in a well to some degree, as will be evidenced by the location of the lefthand ends of the curves of the attached drawing.

The calcium-sequestering agents which have been found particularly useful are water-soluble polyphosphates, for example, tetra sodium pyrophosphate and sodium hexametaphosphate, although other materials which are known in the art of water softening are also useful. Used alone, these materials will reduce to some degree the formation of impingement scale, as will be evidenced by the location of the righthand ends of the curves of the attached drawings. The effective range of proportions of the surface-active agents to the calcium-sequestering agents to obtain a marked reduction of scale deposition, as compared to the use of either agent alone, is shown by the examples of the drawings to be very broad, ranging from about 5 to 80% of the wetting agent to 20–95% of the calcium-sequestering material. Due to the relatively low solubilities of the calcium-sequestering agents, sometimes as low as about 1% at ambient temperatures, these mixtures are introduced into the well in a very dilute solution.

These tests, whose results are shown in the attached drawing, were carried out by measuring the scale inhibiting effectiveness of the materials identified on the chart when 0.02% of the mixtures were added to 100 ml. of a sodium chloride brine having a concentration of 2.5% sodium chloride and saturated with $Ca(HCO_3)_2$ mixed with 5 ml. of stove oil, a light petroleum distillate similar to kerosene, to simulate conditions encountered in actual wells. The mixture was placed in a metal cup and agitated mechanically for 10 minutes, allowed to stand for 16 hours, and emptied from the cup, which was then washed and dried and the scale deposit weighed. It will be noted from the curves that either of the basic components, the surface-active agent or the calcium-sequestering agent alone, was useful to some degree in reducing the formation of scale, while the combination of surface-active agent from about 5-80% and calcium-sequestering agent from about 20-95% produced a very marked reduction in the scale deposited.

In one well producing about six barrels of oil and 130 42-gallon barrels of water per day in which scale accumulation required periodic shutdowns and removal of tubing, pump, etc., for cleaning at intervals of about 30 days, four parts of "Oronite Sulfonate No. 4," a sodium sulfonate having an average molecular weight of about 380 derived from aromatic extracts of petroleum distillate and containing a small percentage of sodium sulfate, with one part of tetra sodium pyrophosphate, the mixture being dissolved in 99 parts fresh water, was introduced at the rate of seven gallons per day. This resulted in prevention of scale to an extent that the well was operated until mechanical failure of the pump required shutdown over six months later. At that time the tubing string, valves, rods, and pump showed a negligible amount of loose and sludgy scale, with no sign of the hard impingement scale formed on the operating mechanism when the treatment was not employed.

Although specific examples of the preferred materials have been given, it is obvious that there are numerous examples of equivalent materials which may be substituted without departing from the invention, so that such changes and modifications as are within the scope of the appended claims are embraced thereby.

I claim:

1. The method of preventing deposition of impingement carbonate scale on metal parts in a well producing oil or gas and water, which comprises introducing into the well during normal production of oil and water therefrom and in the absence of acid, a mixture of 5-80% of a wetting agent which is a surface-active water-soluble sulfonate with 20-95% of a water-soluble polyphosphate calcium-sequestering agent and sufficient water to maintain said mixture in solution.

2. The method according to claim 1 in which the wetting agent is chosen from the group of water-soluble alkali-metal alkyl aromatic sulfonates with molecular weights ranging between about 250 and 450.

3. The method according to claim 1 in which the wetting agent is chosen from the group of water-soluble sodium alkyl aromatic sulfonates with molecular weights ranging between about 300 and 450, and said calcium-sequestering agent is a water-soluble alkali metal polyphosphate.

4. The method according to claim 1 in which the wetting agent is chosen from the group of water-soluble sodium-alkyl aromatic sulfonates with molecular weights ranging between about 300 and 450, in which said calcium-sequestering agent is chosen from the group consisting of tetra sodium pyrophosphate and sodium hexametaphosphate.

5. The method of preventing deposition of impingement carbonate scale on metal parts in a well producing oil or gas and water which comprises introducing into the well while said well is producing and in the absence of acid, a mixture of 40-70% of a water-soluble sulfonate wetting agent with 30-60% of a calcium-sequestering agent which is a water-soluble alkali metal polyphosphate with sufficient water to maintain said mixture in solution.

6. The method of preventing deposition of impingement carbonate scale on metal parts in a well while it is producing oil or gas and water, which comprises producing said well and introducing into the well a mixture of 5-80% of a water-soluble wetting agent derived from petroleum and containing sulfonates and sulfates, with 20-95% of a calcium-sequestering agent chosen from the group consisting of tetra sodium pyrophosphate and sodium hexametaphosphate and sufficient water to maintain said mixture in solution.

JOSEPH F. CHITTUM.

REFERENCES CITED

The following references are of record in the file of this patent:

UNITED STATES PATENTS

| Number | Name | Date |
| --- | --- | --- |
| 2,128,161 | Morgan | Aug. 23, 1938 |
| 2,244,512 | Brandt | June 3, 1941 |
| 2,306,147 | Williams | Dec. 22, 1942 |
| 2,429,594 | Case | Oct. 28, 1947 |